United States Patent [19]

Matthews

[11] 4,026,111
[45] May 31, 1977

[54] METHOD OF REMOVING DISSOLVED NON-CONDENSIBLES FROM GEOTHERMAL BRINES

[75] Inventor: W. Thomas Matthews, Walnut Creek, Calif.

[73] Assignee: The Dow Chemical Company, Midland, Mich.

[22] Filed: Feb. 3, 1976

[21] Appl. No.: 654,826

[52] U.S. Cl. .............................................. 60/641
[51] Int. Cl.² ..................... F01K 21/00; F03G 7/00
[58] Field of Search ..................................... 60/641

[56] References Cited

UNITED STATES PATENTS 3,605,403  9/1971  Aikawa et al. ...................... 60/641
3,862,545  1/1975  Ellis et al. ............................ 60/641
3,893,299  7/1975  Hutchinson et al. ................. 60/641
3,908,381  9/1975  Barber et al. ........................ 60/641

Primary Examiner—Allen M. Ostrager
Attorney, Agent, or Firm—R. R. Stringham

[57] ABSTRACT

Heat energy is more efficiently recovered from geothermal brines by preflashing the brine to remove dissolved, non-condensible gases before flashing the brine to produce motive steam. Power requirements for removal of non-condensibles from turbine exhausts (in order to maintain adequately low exhaust pressures) are obviated. The heat content of the pre-flashed vapors may be largely utilized for superheating and reheating the motive steam.

4 Claims, 1 Drawing Figure

METHOD OF REMOVING DISSOLVED NON-CONDENSIBLES FROM GEOTHERMAL BRINES

BACKGROUND OF THE INVENTION

1. Field of the Invention

This invention relates to the recovery of heat energy from geothermal aquifers.

2. Description of the Prior Art

The prior art pertinent to the present invention is believed to be limited to the technology which has been adapted to or developed in conjunction with recovery of thermal energy from geothermal brines.

The known art involved in the utilization of geothermal brines is summarized in number 12 of a series of publications by the Unesco Press on earth sciences; *Geothermal Energy, Review of Research and Development* (The Unesco Press, 7 Place de Fontenoy, 75700 Paris, France; (1973)).

Brines obtained from naturally heated aquifers have been utilized for various purposes since at least as early as ancient Rome. The most dramatic and best known use for geothermal energy is electric power generation, as practiced in Italy, Japan, Iceland, New Zealand, Mexico and the United States (California). In some locations, "dry" steam, produced as such from geothermal wells, is employed for this purpose. In other locations, wet steam, present as such in a geothermal formation or formed by flashing of hot brines, is used.

Most geothermal fluids, steam and hot water, contain dissolved non-condensible gases. Existing geothermal power processes utilizing hot water or brines often flash the fluid to produce motive steam which is then used in a steam turbine for production of electricity. The vast majority of the non-condensible gases present in the geothermal fluid are consequently flashed into the motive steam. The steam exhausting from the turbine is condensed under varying vacuum conditions. The non-condensible gases must be removed from the exhaust steam in order to maintain the desired vacuum in the turbine exhaust system. The equipment required to remove the non-condensibles can require a significant amount of power in the form of either motive steam for steam power ejectors, or mechanical power for vacuum pumps. Thermodynamic efficiency can be severely constrained as the percentage of non-condensible gases increases.

Some non-condensible gas components, such as hydrogen sulfide, are too obnoxious to be discharged to the atmosphere. Thus, when brines containing such gases are flashed to provide motive steam, the non-condensibles separated from the turbine exhaust cannot simply be vented to the atmosphere without additional treatment.

Pretreatment of geothermal brines or of steam produced therefrom has heretofore been limited to such practices as scrubbing of steam (at Wairakei, New Zealand) to remove entrained brine droplets. It has not previously been proposed to remove non-condensibles from hot waters or brines, otherwise suitable as sources of motive steam.

OBJECTS OF THE INVENTION

A primary object of the present invention is to effect an increase in the thermodynamic efficiency of a conventional method of utilizing geothermal brines as direct sources of motive steam.

An additional object is to provide a method of removing non-condensible gases from geothermal brines which is particularly well adapted to use with multi-stage turbines powered by steam produced from such brines.

A further object is to provide an improved system for obtaining mechanical or electrical power from geothermal brines containing dissolved, non-condensible gases.

Another object is to reduce erosion and corrosion of turbine blades and other equipment contacts with steam derived from such brines.

It is also an object to facilitate non-polluting disposal of non-condensible gases containing obnoxious components.

Still other objects will be made apparent to those skilled in the art by the following disclosure.

SUMMARY OF THE INVENTION

The present invention is an improved process for producing motive steam by flashing of hot brines containing non-condensible gases, said improvement comprising:

a. preflashing said brine to produce a hot vapor phase enriched in said gases and a hot liquid phase depleted therein, and b. producing said motive steam by flashing said hot liquid phase.

In a preferred mode of operation, the pre-flash is carried out in such manner that the content of non-condensibles in the resulting liquid phase is reduced below a pre-selected level.

In another preferred mode of operation, the vapor phase produced in the pre-flash is used to superheat the motive steam produced upon subsequent flashing of the liquid phase, thereby increasing the quality of the motive steam and reducing the potential for turbine blade erosion. Preferably, heat then remaining in the preflashed vapor phase is utilized to reheat the motive steam as it passes from stage to stage of a multi-stage turbine.

BRIEF DESCRIPTION OF THE DRAWINGS

The sole drawing (FIG. 1) is a flow sheet for a geothermal power plant constituting a preferred embodiment of the present invention in which a multi-stage turbine is powered with motive steam obtained by flashing a preflashed brine.

DETAILED DESCRIPTION

Figure 1:
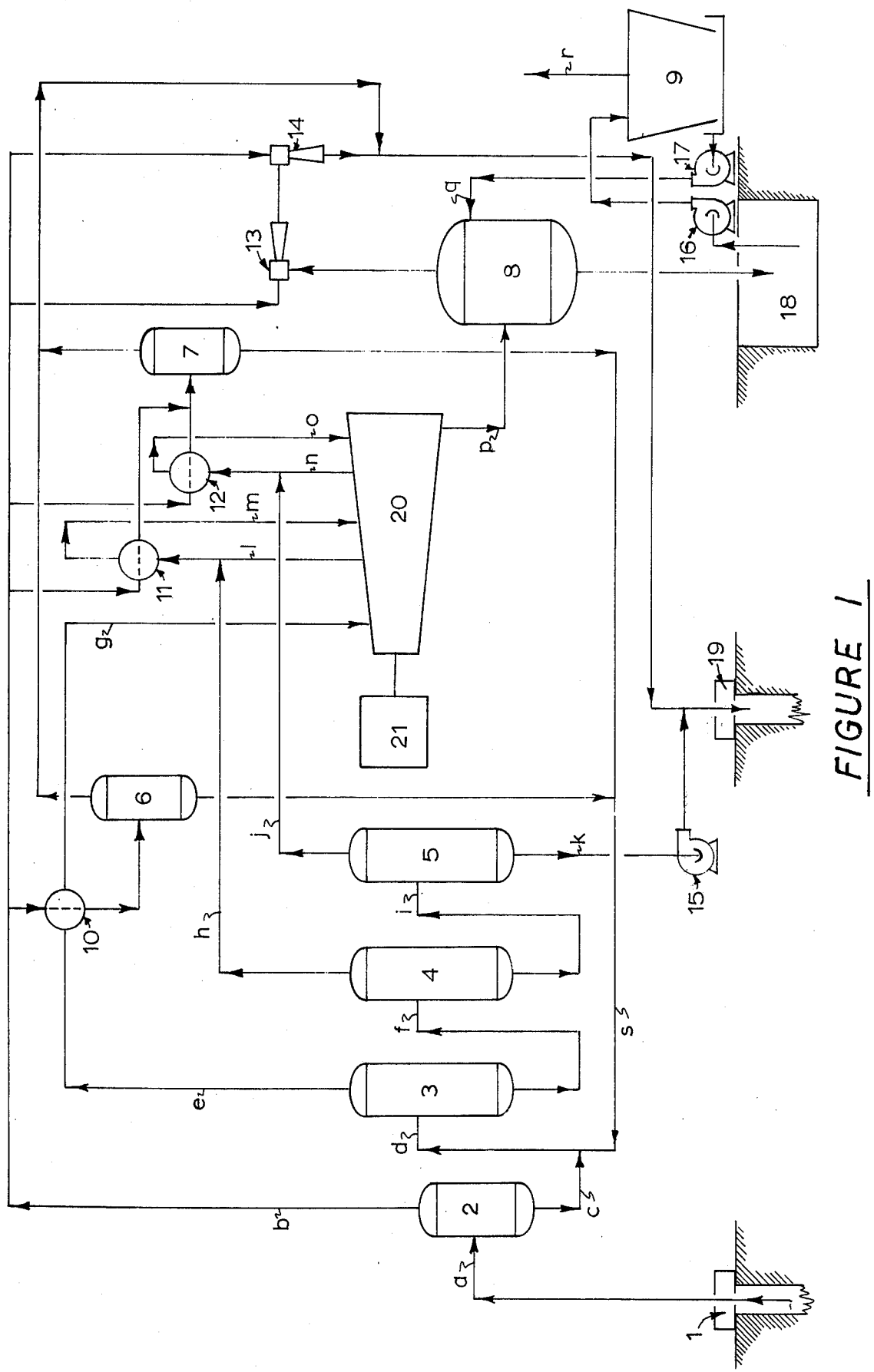

According to Sigvaldason (see the Unesco publication cited earlier herein), geothermal brines have been arbitrarily classified into several main types, according to their predominant mineral components:

1. Sodium chloride brines (the most common type in large aquifers) are generally neutral at depth but become somewhat alkaline upon losing steam and $CO_2$; the ratio of $Cl^-$ to $SO_4^=$ is high in these brines;

2. Acid sulphate/chloride brines, having relatively high ratios of bisulphate to chloride ions are rare and their acidity is attributed to oxidation of sulphide to bisulphate, at depth.

3. Acid sulphate brines are common in fumaroles. Their acidity is attributed to oxidation of $H_2S$ to $H_2SO_4$ and their chloride contents are very low.

4. Calcium bicarbonate brines occur as warm springs, precipitate calcite and are too cool to be economically processable.

More than one type of brine can occur within a given geothermal system and the composition of the thermal gases (other than steam) associated with a given brine type can vary. Three main types of thermal gases are discernible:

1. High nitrogen content; little or none of active gases;
2. Very high $CO_2$ and minimal $H_2S$ and $H_2$ contents;
3. High contents of $H_2$, $H_2S$ and $CO_2$.

Other constituents of thermal gases are methane, Argon, ammonia and $H_3BO_3$.

The dependency of solubility equilibria between various mineral and gaseous components of brines on temperature and pressure is quite complex. Consequently, it is difficult to predict how much flashing or stripping of a given brine can be permitted to occur without experiencing precipitation of silica, calcite, etc. However, the occurrence or non-occurrence of precipitation is independent and not controlling of the practice of the present invention. So long as the amount and character of any precipitate formed during the pre-flash step is not such as to interfere to an intolerable extent with subsequent utilizaton of the water contained in the resultant slurry, the process is operable. Pre-flash and subsequent operating conditions most favorable to avoiding or satisfactorily handling precipitates may readily be determined by means of test procedures familiar to those skilled in the art.

Referring now to FIG. 1, a representative plant embodying the present invention will now be described (except for such conventional items as control instrumentation, valves, etc.). Small case letters are used to designate various streams for which typical temperatures, heat contents, pressures, flow rates, compositions, etc. are given in a subsequent tabulation herein.

A hot brine ($a$), containing non-condensible gases, is produced from a geothermal well 1 and introduced to flash vessel 2 wherein it is preflashed to form a hot vapor stream ($b$) and a hot liquid stream ($c$). Vapor stream ($b$) is utilized, in heat exchangers 10, 11 and 12, respectively, to heat streams $e$, ($h + l$) and ($j + n$) and in steam ejectors 13 and 14 to maintain exhaust vacuum for turbine 20. The portion of stream ($b$) condensed in exchanger 10 is subsequently separated in vessel 6 and the condensate formed in exchangers 11 and 12 is subsequently separated in vessel 7. Hot liquid stream ($c$) and ($s$) are combined and flashed (as stream $d$) in vessel 3. The resulting vapor stream ($e$) is superheated in exchanger 10 and introduced (as $g$) to the first stage of turbine 20.

The hot liquid ($f$) from vessel 3 is reflashed in vessel 4 to form vapor stream ($h$), which is combined with the exhaust ($l$) from the first stage of turbine 20, reheated in exchanger 11 and introduced (as $m$) to the second stage of the turbine. Similarly, the liquid ($i$) from vessel 4 is finally flashed in vessel 5 and the resulting vapor stream ($j$) is combined with the exhaust ($n$) from the second stage of the turbine, reheated in exchanger 12 and introduced (as $o$) to the third stage of turbine 20. The final exhaust ($p$) is quenched (by stream $q$) in vessel 8, which is maintained at a reduced pressure by ejectors 13 and 14 to ensure removal of any non-condensibles present in ($p$). The liquid condensate is dumped to sump 18, and transferred by pump 16 to cooling tower 9, from which stream $q$ is taken by pump 17. The vapor stream from vessel 8 is combined with the portions of ($b$) introduced to ejectors 13 and 14, with the vapor stream from vessel 6 and with the liquid ($k$) from vessel 5 to form a cool, reconstituted brine which is returned to the aquifer by pump 15 through an injection well 19. (The latter well is located at a sufficient distance from any production wells, such as 1, to avoid undue cooling of the producing zone.) Electric power is produced by generator 21, driven by turbine 20. Stream $r$ is the fan driven, wet air exhaust from cooling tower 9.

The gas stream which is combined with liquid stream ($k$) to form the reconstituted brine is under a pressure of about 30 psia.

In the following table, compositions, flow rates, heat contents, temperatures and pressures are given for operation of the plant of FIG. 1 to produce 63,547 K.W. of power (gross) from 15000 gallons per minute of brine issuing from well 1 in which bottom-hole conditions are 412° F. and 285 psia. The tabulated quantities are calculated with the aid of a standard Mollier diagram by methods well known to those skilled in the art. The net power produced (59,747 K.W.) is calculated by subtracting 3800 K.W. for internal power requirements (pumps 15, 16 and 17 and the cooling tower fans — not shown) from the gross.

A compressor (not shown in FIG. 1) may be required in order to effect redissolution of the gaseous components of the reconstituted (cool) brine and reinjection into the aquifer. In this event, a further reduction in net power production will of course result.

TABLE I

| Stream | a | b | c | d | e | f | g | h | i |
|---|---|---|---|---|---|---|---|---|---|
| Component-M lbs./Hour | | | | | | | | | |
| Water | 6607.4 | 267.3 | 6340.2 | 6490.1 | 458. | 6032.1 | 458. | 371.0 | 5661. |
| $CO_2$ | 2.54 | 2.41 | .1 | .1 | .1 | — | .1 | — | — |
| $H_2S$ | .02 | .02 | — | — | — | — | — | — | — |
| Total M lbs./Hour | 6610. | 269.7 | 6340.3 | 6490.2 | 458.1 | 6032.1 | 458.1 | 371.0 | 5661. |
| Enthalpy - BTU/lb. | 388.1 | 1198. | 353.6 | 353.6 | 1185.2 | 290.4 | 1207.4 | 1168.7 | 232.8 |
| Temperature - ° F. | 412. | 380. | 380. | 380. | 320. | 320. | 360. | 264. | 264. |
| Pressure - psia | 285. | 196. | 196. | 196. | 90. | 90. | 88. | 38. | 38. |

| Stream | j | k | l | m | n | o | p | q | r | s |
|---|---|---|---|---|---|---|---|---|---|---|
| Component-M lbs./Hour | | | | | | | | | | |
| Water | 307.2 | 5353.8 | 458.0 | 829.0 | 829.0 | 1136.2 | 1136.2 | 38500 | 1156.0 | 149.1 |
| $CO_2$ | — | — | — | — | — | — | — | — | — | — |
| $H_2S$ | — | — | — | — | — | — | — | — | — | — |
| Total - M lbs./Hour | 307.2 | 5353.8 | 458.0 | 829.0 | 829.0 | 1136.2 | 1136.2 | 38500 | 1156.0 | 149.1 |
| Enthalpy - BTU/lb. | 1150.5 | 180. | 1163.4 | 1215. | 1151. | 1220. | 1083.5 | — | — | 353.6 |
| Temperature - ° F. | 212. | 212. | 264. | 360. | 213. | 360. | 100. | 70 | 86° F. | 380° F. |
| Pressure - psia | 14.7 | 14.7 | 38. | 36. | 14.7 | 12.7 | .95 | — | ATM | 196. |

FIG. 1 and the foregoing description are for purposes of illustration and are not to be construed as restricting the scope of the present invention to a greater extent than the claims accompanying this specification. Those skilled in the art will recognize that various modes of operation, alternative to that depicted in FIG. 1, are within the ambit of the invention.

For example, the vapor stream from the pre-flash, after being utilized to superheat and reheat the motive steam and separated from the resulting condensate, may be further utilized to reheat said condensate (and other condensates) and then processed for selective removal of obnoxious gases such as $H_2S$ and vented, without being used to operate steam injectors or reinjected into the aquifer. The reheated condensates, being essentially free of non-condensibles, may be combined with the motive steam (from a first flash for same) prior to superheating. The final condensate (from the pre-flash vapor stream) may be combined with the liquid feed to a subsequent flash from which motive steam is obtained for use (in combination with the exhaust from the first stage of a two-stage turbine; reheated) in the second stage of the turbine. A portion of the vapor from the first motive steam flash may be used to operate the steam injectors. Cooling of the water used to quench the final exhaust may be effected in an evaporation pond, rather than in a cooling tower.

The calculated net power production for a plant incorporating the preceding alternatives and operated on 6,000,000 pounds per hour of a 500° F., 3550 psia brine containing 17% NaCl, 3% $CO_2$ and 0.0033% $H_2S$ is 50,000 K.W.

What is claimed is:

1. An improved method of driving a turbine with motive steam produced from a hot brine which contains non-condensible gases, said improvement comprising:
   a. preflashing said brine to produce a hot vapor phase enriched in said gases and a hot liquid phase depleted therein,
   b. producing said motive steam by flashing said hot liquid phase, and
   c. driving said turbine solely with said motive steam.

2. The process of claim 1 in which the content of non-condensibles in said hot liquid phase is reduced below a preselected level.

3. The process of claim 1 in which said hot vapor phase is used to superheat said motive steam.

4. The process of claim 3 in which said hot vapor phase is also used to reheat the motive steam as it passes from stage to stage of a multi-stage turbine.

* * * * *